(12) United States Patent
Baentsch (10) Patent No.: US 6,536,671 B1
(45) Date of Patent: Mar. 25, 2003

(54) AUTOMATIC RECOVERY OF INTEGRATED CIRCUIT CARDS

(75) Inventor: Michael Baentsch, Langnau (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/701,915

(22) PCT Filed: Apr. 14, 1999

(86) PCT No.: PCT/IB99/00653

§ 371 (c)(1),
(2), (4) Date: Dec. 5, 2000

(87) PCT Pub. No.: WO99/64985

PCT Pub. Date: Dec. 16, 1999

(30) Foreign Application Priority Data

Jun. 8, 1998 (EP) .............................. 98110424

(51) Int. Cl.⁷ ............................................... G06K 19/00
(52) U.S. Cl. ....................................................... 235/487
(58) Field of Search .......................................... 235/487

(56) References Cited

U.S. PATENT DOCUMENTS

| 4,621,190 A | | 11/1986 | Saito et al. | |
| 5,451,762 A | | 9/1995 | Pickett et al. | |
| 5,634,000 A | * | 5/1997 | Wicht | 714/10 |
| 5,920,726 A | * | 7/1999 | Anderson | 713/300 |
| 5,987,438 A | * | 11/1999 | Nakano et al. | 235/375 |

FOREIGN PATENT DOCUMENTS

| EP | 0 526 139 A2 | 2/1993 |
| WO | WO 9636947 A | 11/1996 |

* cited by examiner

Primary Examiner—Thien M. Le
Assistant Examiner—Lisa M. Caputo
(74) Attorney, Agent, or Firm—Scully, Scott, Murphy & Presser; Louis P. Herzberg (57) ABSTRACT

Integrated circuit cards comprising a microprocessor, volatile memory (RAM), non-volatile memory (ROM, EEPROM), and a power coupling device allowing external power to be supplied to the card. The integrated circuit cards further comprise failure protection device for maintaining power for a short period of time in case of a power supply failure, and a power-failure detector sensing a power supply failure. This power-failure detector triggers the transfer of information from the volatile memory to the non-volatile memory if a power supply failure is sensed. The failure protection device provides power for this transfer. The integrated circuit cards further comprise a device for setting a power supply failure indicator (PF) into the non-volatile memory if a power supply failure is sensed by the power-failure detector, in order to leave a trace that a power supply failure has occurred, where the failure protection device provides the power for setting the indicator (PF).

26 Claims, 4 Drawing Sheets

AUTOMATIC RECOVERY OF INTEGRATED CIRCUIT CARDS

CROSS REFERENCE TO RELATED APPLICATIONS

This application is a 371 of PCT/IB99/00653 filed Apr. 14, 1999.

TECHNICAL FIELD

The invention concerns integrated circuit cards, such as smartcards, in general, and an automatic recovery scheme in particular.

BACKGROUND OF THE INVENTION

Integrated circuit cards (ICCs), more widely known as smartcards, are small credit card size carriers containing electronics. The smartcard concept began in Europe prior to 1985, and is today being used in telephone systems, toll roads, game parlors, and personal computers, just to mention some applications.

In the following, the term integrated circuit card will be used, because ISO uses the term to encompass all those devices where an integrated circuit is contained within a card-size piece of plastic, or the like.

So far, ICCs have only been used in one of two ways. Either, the ICCs provide simple, more or less tamper-proof storage for small amounts of data, or they execute simple security-related operations like data signature, or encryption-based authentication, e.g. employing a challenge-response protocol. Some applications like pre-paid telephone or cinema cards, as well as health care cards storing personal data make use of the first property. ICCs in the second domain are used as secure tokens executing authentication procedures for example during computer system logon, or when opening appropriately equipped doors for access to a restricted area.

Typical ICCs supporting the above two modes of operation or use comprise a microprocessor (central processing unit, CPU), a read-only memory (ROM), a random-access memory (RAM), and some type of non-volatile, programmable memory, such as an EEPROM (electrically erasable programmable read only memory). In addition, an ICC usually comprises some kind of a bus (such as a serial bus) and I/O ports for interconnection to a card terminal and for communication with the outside world. Such a card terminal provides the necessary power, electric signaling at the hardware level, as well as the basic communication protocols at the software level to interact with the ICC. Two types of card terminals are available: The more expensive model physically locks the. ICC as a whole. Alternatively, and in order to reduce cost of card terminals, it is also very common to only provide a slot into which the user can insert and from which he can retract the ICC at will.

EP-A-0526 139 describes an integrated circuit card comprising a processor, volatile memory, non-volatile memory, power coupling means allowing external power to be supplied to the card, failure protection means maintaining power for a short period of time in case of a power supply failure, and a power-failure detector sensing a power supply failure. The power-failure detector triggers the transfer of information from the volatile memory to the non-volatile memory if a power supply failure is sensed, and the failure protection means provide power for this transfer.

WO96/36947 describes a technique for transaction recovery in a value transfer system.

Most ICCs comprise components in form of integrated circuits which are molded together on a flexible card (e.g. PVC or ABS). The dimension of these integrated circuits (ICs) is at most 25 mm$^2$ (silicon die size). A typical ICC has a size of 85.6 mm×53.98 mm×0.76 mm It is to be expected that the ICC's integrated circuits shrink in size and that these ICCs become more and more powerful, taking advantage of advanced semiconductor technology.

The contents of the ROM type of memory is fixed and can not be changed once manufactured by the semiconductor company. This is a low cost memory, in that it occupies minimum space on the substrate. It is a disadvantage of a ROM that it cannot be changed and that it takes several months to be produced As opposed to this, an EEPROM is erasable by the user and can be rewritten many times, ROMs and EEPROMs are non volatile. In other words, when the power is removed they still retain their contents. A RAM is a volatile memory and as soon as the power is removed the data content is lost A RAM, however, has the advantage that it is much faster than ROMs and EEPROMs. On the other hand, a RAM is more expensive in terms of die size.

ICCs come in two forms, contact and contactless. The former is easy to identify because of its gold connector I/O ports. Although the ISO Standard (7816-2) defined eight contacts, only six are actually used to communicate with the outside world The contactless card may contain its own battery, particularly in the case of a "Super Smart Card" which has an integrated keyboard and LCD display. In genera; however, the operating power is supplied to the contactless card electronics by an inductive loop using low frequency electronic magnetic radiation. The communications signals may be transmitted in a similar way or can use capacitive coupling or even an optical connection.

Recent advances in chip design enabled the introduction of FlashRAM for non-volatile memory and 32-bit microprocessors on the same silicon estate. Thus, ICCs are getting powerful enough to host simple, but nonetheless fully functional applications, by far exceeding the simple read/write, respectively encrypt/decrypt routines as outlined above. For example, complex security-related operations like full-blown cryptographic or electronic commerce protocols could be run on the card itself and need no longer reside on a more insecure personal computer.

For most applications in the simple read/write, respectively encrypt/decrypt scenarios outlined above, power-loss by card retraction at any time does not create a serious problem. As an example for the first scenario, a telephone card's credit/debit amount can always be stored into persistent memory on the ICC, before an action (i.e. a call) is taken. For the second usage type, recovery is even more easy. If an authentication cannot be completed, the card simply does not provide its service. In both cases, it is possible to find a way that no harm is done to the card's functionality if the user retracts the ICC prematurely from the card terminal.

However, there are other kinds of nontrivial applications, where premature card extraction, or interruption of the inductive loop providing power to a contactless ICC using electronic magnetic radiation, might create a serious problem since it leads to the immediate loss of supply voltage. Due to this loss of supply voltage, all contents of the ICC's RAM, and with it the whole transient application state is lost immediately and irrevocably. Such a loss of application state can possibly wreak havoc to a system not prepared to handle this type of event.

Currently, two main approaches for dealing with this problem are known, or under development for ICCs.

According to the first approach, RAM is not used at all for any type of operation involving data that has to be kept permanent and consistent. Unfortunately, always using non-volatile memory has a couple of serious drawbacks. One is the extreme performance penalty that has to be paid as every memory write access is roughly 500 to thousand times slower when using EEPROM or FlashRAM instead of RAM. An even more serious problem is the limitation on the amount of guaranteed write cycles (100000 times for EEPROM, 1000000 times for FlashRAM, respectively). In the new setting, where memory-intensive applications like cryptographic protocols may continuously access this memory, these figures can easily be reached within a couple of minutes. After this time, an ICC would simply cease to operate, or its reliability would be drastically reduced.

In order to address this problem, a second approach using the well-known transaction concept from database development has been adopted. This concept permits applications to use the ICC's RAM, but the application developer has to ensure that critical data structures are always guarded by transaction 'brackets'. A transaction bracket is a code segment marked at the starting with a source code statement 'transaction begin' and at the end with either a 'transaction commit' (success), or a 'transaction abort' (failure). The semantics of these routines are well-known from database programming and are provided by the underlying runtime system of the ICC. Semantic integrity checks however are hard to provide automatically and thus always rest with the application programmer using transaction functions. Details on the transaction concept are given in "The transaction concept: Virtues and limitations", J. N. Gray, Proc 7th International Conference on Very Large Database Systems, 1981, pp. 144–154. The main problems with this approach are twofold. For one, this type of programming is extremely error-prone. By omitting just one transaction on a crucial data structure, the whole application can behave inexplicably, and even worse, in case of application interaction as now possible on an ICC, other programs can be crashed as well, although they may have been programmed correctly. Secondly, transactions have to be programmed anew for every new application on any type of ICC. In combination with the huge numbers of delivered units, coding and testing have to be very thorough and are thus expensive.

It is an object of the present invention to provide an integrated circuit card that allows information to be automatically recovered after a failure of the external power supply.

It is another object of the present invention to provide a scheme for the storing and/or recovery of information in case of a failure of the power externally supplied to an integrated circuit card.

It is another object of the present invention to provide improved card terminals.

SUMMARY OF THE INVENTION

In accordance with the present invention, there is now provided integrated circuit card comprising: a processor, volatile memory; non-volatile memory; power coupling means allowing external power to be supplied to the card; failure protection means maintaining power for a short period of time in case of a power supply failure; and a power-failure detector sensing a power supply failure; wherein the power-failure detector triggers the transfer of information from the volatile memory to the non-volatile memory if a power supply failure is sensed, and the failure protection means provides power for this transfer; said card being characterized in that it further comprises means for setting a power supply failure indicator (PF) into said non-volatile memory if a power supply failure is sensed by said power-failure detector, in order to leave a trace that a power supply failure has occurred, the failure protection means providing the power for setting said indicator (PF).

Viewing the present invention from another aspect, there is now provided. Recovery means for use in an integrated circuit card comprising a processor, volatile memory, non-volatile memory, and power coupling means allowing external power to be supplied to the card, said recovery means comprising failure protection means supplying power to the integrated circuit card for a short period of time in case of a power supply failure, and a power-failure detector sensing a failure of the external power supplied to the integrated circuit card, wherein the power-failure detector triggers the transfer of information from the volatile memory to the non-volatile memory if a failure of the external power is sensed, and the failure protection means supply power to the integrated circuit card for this transfer, said recovery means being characterized in that it further comprises means for setting a power supply failure indicator (PF) into said non-volatile memory if a power supply failure is sensed by said power-failure detector, in order to leave a trace that a power supply failure has occurred, the failure protection means providing the power for setting said indicator (PF).

Viewing the present invention from yet another aspect, there is now provided Method for the protection of information being stored in a volatile memory of an integrated circuit card, said integrated circuit card further comprising a processor, non-volatile memory, and power coupling means allowing external power to be supplied to the card, said method comprising the following steps: detecting a failure of the external power supplied to the integrated circuit card, reading information from the volatile memory and transferring it to the non-volatile memory, writing the information into said non-volatile memory, setting a power supply failure indicator (PF) into said non-volatile memory in order to leave a trace that a power supply failure has occurred, and supplying power, provided by a failure protection means being part of the integrated circuit card, at least during the execution of the above steps.

The present invention concerns integrated circuit cards comprising a microprocessor, volatile memory (RAM), non-volatile memory (ROM, FROM), and power coupling means allowing external power to be supplied to the card. Cards, according to the present invention, comprise failure protection means maintaining power for a short period of time in case of a power supply failure, and a power-failure detector sensing a power supply failure. This power-failure detector triggers the transfer of information from the volatile memory to the non-volatile memory if a power supply failure is sensed. The failure protection means provide power for this transfer.

The present invention also concerns methods for the storing of information in a persistent memory if externally supplied power fails, and a method for the automatic recovery after such a failure.

The inventive approach allows ICCs to fully recover after a power failure without application intervention Computations can resume regardless of the duration of a power failure. The invention can be easily implemented in current and future ICCs. Further advantages are addressed in connection with the detailed description.

DESCRIPTION OF THE DRAWINGS

The invention is described in detail below with reference to the following schematic drawings. It is to be noted that the Figures are not drawn to scale.

DESCRIPTION OF PREFERRED EMBODIMENTS

Figure 1:
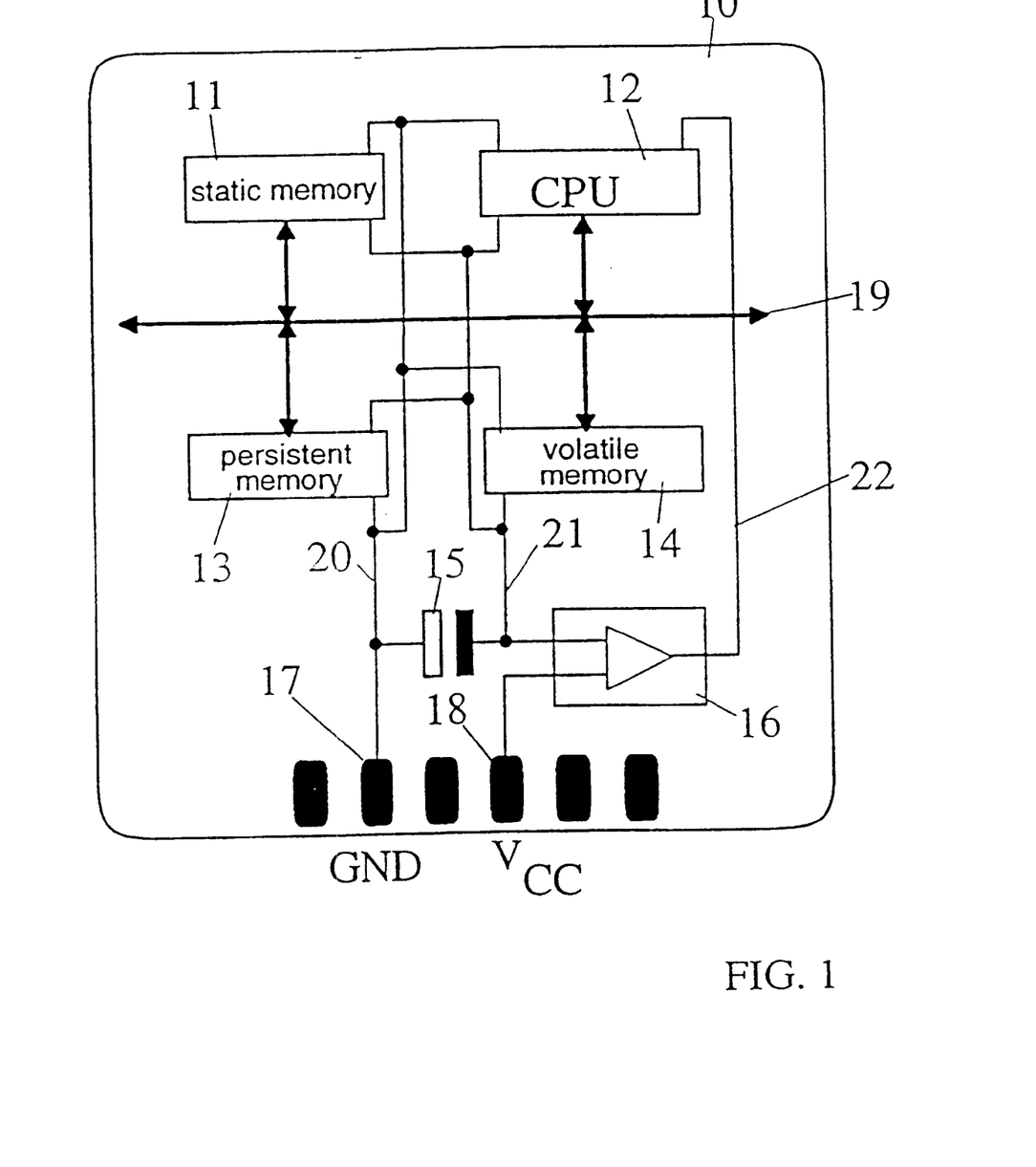
FIG. 1 is a schematic top view of a first embodiment, in accordance with the present invention.

The basic concept of the present invention is described in connection with a first embodiment illustrated in FIG. 1. In this figure, an integrated circuit card (ICC) 10 is shown. This card carries a microprocessor 12, a ROM 11, an EEPROM 13, and a RAM 14, like most conventional ICCs. The ICC 10 furthermore comprises an internal bus 19, which allows exchange of information and signaling between the ICC's components. This internal bus is usually not connected to the input/output (I/O) ports which are shown as black contact pads.

To prevent manipulation of ICCs, usually only a very limited access to data streams is provided. The processor 12 communicates via the I/O ports with the card terminal (not shown in FIG. 1). This communication is increasingly encrypted.

ICC 10 is a contact card. The I/O ports connect to corresponding means of a card terminal. As indicated in FIG. 1, power is supplied via port 17 (ground, GND) and port 18 (positive voltage, $V_{CC}$). The voltage between these two ports 17 and 18 is applied to the components 11, 12, 13, and 14 of the ICC 10. Since there is no battery integrated into the card 10, these components completely rely on the external power supply. If this power supply is interrupted, (e.g. because the card is removed from the card terminal), or if there is a power supply failure (e.g. the voltage drops off), while a transaction is performed, or during operation of the card 10, all contents of the RAM 14 and definitely also the contents of the processor registers is lost, and the processing is immediately stopped. In other words, the current application state is lost.

To prevent this situation unacceptable to most applications, the first embodiment comprises failure protection means which are designed to maintain the power for a short period of time. As shown in FIG. 1, a special capacitor 15 is employed in the present example. This capacitor 15 is placed such that the voltage between the GND line 20 and $V_{CC}$ line 21 can be maintained for a short period of time.

To provide a capacitor is not sufficient, because this capacitor would simply delay the breakdown of the supply voltage. Critical information in the RAM 14 and the processor registers would still be lost. In addition to the capacitor 15, the failure protection means comprise means which cause information to be transferred from volatile memory to non-volatile memory, as will be described later.

According to the present invention, a power-failure detector 16 is provided which senses and reports the loss of external power. In the present implementation, a voltage comparator together with an appropriate diode (not shown) serves as power-failure detector 16. This voltage comparator detects a power supply failure (e.g. a power-down situation, or a voltage drop) and signals (power failure) to the the failure protection means that a power supply failure occurred. In the present embodiment, part of the failure protection means are realized within the processor 12. As shown in FIG. 1, the processor 12 is informed about the power failure via signaling line 22. The failure protection means within the processor 12 initiate a short sequence of steps for transferring information from the RAM and/or the processor registers to a non-volatile memory. The ICC 10 has a non-volatile memory 13 (e.g. a low-voltage FlashRAM) which receives and stores the information transferred from the RAM 14 and the processor's registers. If the power-failure detector 16 senses a power failure, it causes the following steps to be carried out:

reading information stored in RAM 14 and/or processor registers,     transferring this information to a non-volatile memory (EEPROM 13 in the present embodiment), and     writing this information in the non-volatile memory.

On a subsequent power-up, or if the failure is over, the RAM and/or the register states are restored as a whole, or in part, depending on the particular implementation, such that the computations can be continued. The capacitor 15 is automatically recharged if the power becomes available again, e.g. on the next insertion into a card terminal.

According to another embodiment of the present invention, a record is kept in the ICC to allow later reconstruction of events. This record keeping might be facilitated by a simple counter which counts the number of power-failure events.

There are two different ways how the processor 12 can be powered up after a power failure. The first approach is to power it up as soon as the external power is fully available again. In this case, it might take a few seconds to recharge the capacitor 15. If the external power would fail before the capacitor 15 is completely recharged, there is a certain risk that loss of information in the processor's registers and/or the RAM 14 occurs again. The more secure second approach is to delay the power up of the processor 12 until the capacitor 15 has been recharged. This approach is more reliable, because any subsequent power failure would again be buffered by the capacitor's energy and no information would be lost.

It is difficult to implement the above described capacitor 15 in an ICC 10, because the real estate for circuitry is limited, the cards have to be thin, flexible, low cost, and very reliable. In addition, the capacitor 15 has to be able to keep sufficient energy (high capacitance) for voltage maintenance during a predetermined period of time.

The standard capacitor discharge model can be used to estimate the capacitance required to provide sufficient energy while information is transferred to a non-volatile memory. The discharge model is based on a resistor R discharging a capacitor C. The differential equation for the voltage at C is at any given time into the discharge:

$$U_C(t) + R \cdot C \cdot d/dt U_C(t) = 0$$

This equation is solved for the capacitor's voltage at any time during discharge [$U_C$(t)] to:

$$U_C(t) = U_0 \cdot e^{-t/(R \cdot C)}$$

The required capacity to maintain a voltage of U after t seconds into the discharge results in:

$$C = t/(R \cdot \ln U/U_0)$$

Setting R as $U_{CC}/I_{CC}$ with $U_{CC}$ being the supply voltage of the non-volatile memory 13 (e.g. an AMD FlashRAM Am29LV002 with $U_{CC}$=3V, as described in "Am29LV002 Specifications", AMD Corp. Publication No. 21191, January 1998) and $I_{CC}$ being the current required to write the information into the non-volatile memory 13 (AMD FlashRAM Am29LV002 with $I_{CC}$=30 mA, in the present embodiment), C can be computed based on the amount of time required to store a single byte. In the present embodiment, this time is less than 10 microseconds. With a typical (anticipated) ICC RAM size of 1 KByte, t turns out to be less than 10 milliseconds. With a capacitor overcharge of the typical 5V ($U_0$) seen in card terminals, C computes to 200 microFarad.

To achieve the required capacitance, special capacitors wit high capacitance are required which can be integrated into an ICC. Capacitors suited for usage in connection with the present invention should have an extremely high capacitance in the order of several Farads per $cm^2$. In the present context so-called HICAP capacitors, or super capacitors (SUPERCAP) are employed. A SUPERCAP is a high capacitance value multi-layer ceramic capacitor (also refered to as MLC), which comprises a stack of several ceramic layers formed using ceramic tapes. These tapes are a few microns thick.

These two kinds of capacitors only recently matured. They can be used in an ICC environment if designed appropriately, as demonstrated and reported by M. G. Sullivan et al. in "An Electrochemical Capacitor Using Modified Glassy Carbon Electrodes", Electrochemical Capacitors II, Proceedings Vol. 96–25, pp. 192–201, The Electrochemical Society, Inc., 10 South Main Street, Pennington, N.J., 1997.

In order to ensure that information is transferred from a volatile memory (e.g. RAM 14) to a non-volatile memory (e.g. FlashRAM 13), a software component might be employed. This software component, which is part of the inventive failure protection means, can be implemented in at least the following two ways. Either, a fixed power failure handler is provided in ROM causing the processor 12 to execute the steps shown in FIGS. 2A and 2B, or custom power failure circuitry might be provided to handle the interrupt in the same manner as the software component. Such a custom power failure circuitry is illustrated in connection with the second embodiment (see FIG. 3).

Figure 2A:
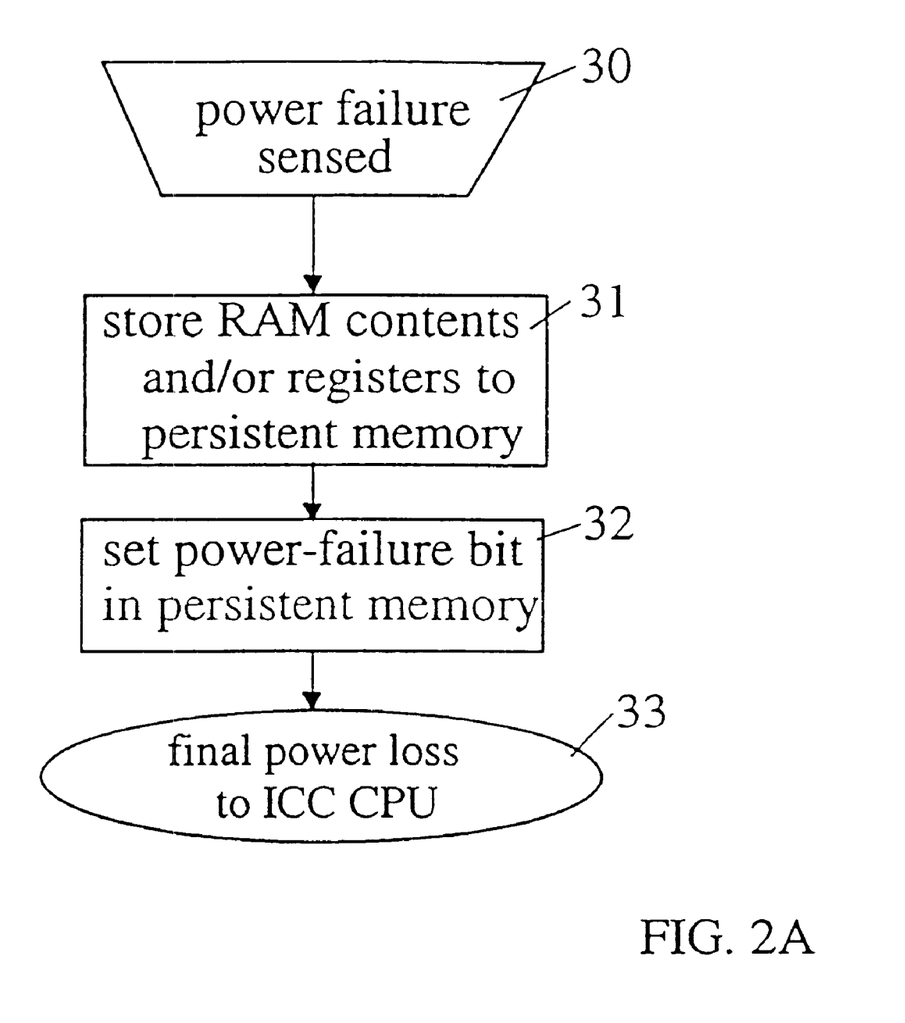
FIG. 2A is a schematic flow diagram used to illustrate the process steps which are carried out in a system, according to the present invention, if a power-down occurs.

Turning now to FIG. 2A, the steps are addressed which are carried out by a power failure handler or custom power failure circuitry if there is power supply failure, e.g. because the external power is down. First, the power failure is sensed by an appropriate power-failure detector, e.g. a comparator 16, as illustrated in box 30. In a next step (box 31), the contents of the volatile memory (e.g. RAM 14) and/or the contents of the processor's registers is transferred to a persistent memory, such as the non-volatile FlashRAM 13, for example. Then, a power failure bit (PF bit) might be set, as indicated in box 32. Since this PF bit will be used by the power-up process, it is necessary to store it in non-volatile memory, too. After completion of these steps, the power provided by the failure protection means is not needed anymore, because all critical information is saved.

The software component (fixed power failure handler) might be programmed such that the processor goes into a suspend mode and terminates certain processes or shuts down components within the ICC that consume power before the failure protection means run out of energy. Then, the final loss of ICC power can occur without doing harm to any application inside the ICC (see box 33).

Future ICCs (e.g., JAVACARDs) will be manufactured partially blank, or without an application program stored thereon, and an application program will then be loaded into the changeable memory, i.e., by downloading it from a computer. In this manner, the application program in an ICC may be changed by an authorized party. The software component constituting the inventive fixed power failure handler, might also be loaded into the ICC, but the hardware—according to the present invention—needs to be present.

Figure 2B:
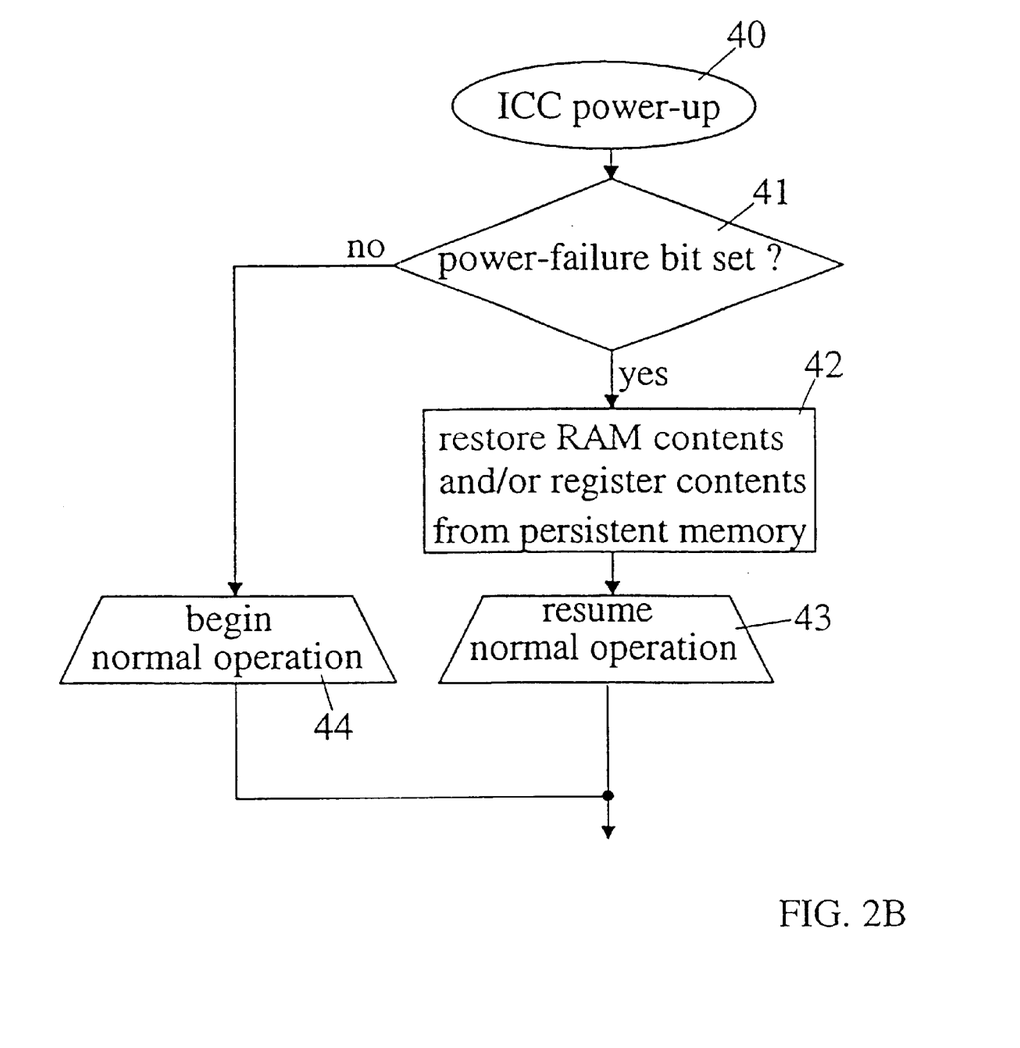
FIG. 2B is a schematic flow diagram used to illustrate the process steps which are carried out in a system, according to the present invention, if power become available again.

If the ICC is powered up again, a few steps are carried out so that the ICC can resume operation as if no interrupt had occurred. The respective process steps are shown in FIG. 2B. If the power becomes available again (box 40), a check is performed to determine whether the PF bit was set (see box 41). If a power failure occurred, this bit is set and the state prior to the power failure is reestablished. This is done by copying or transferring the contents of the non-volatile memory to their original memory locations (box 42). I.e., the former contents of the RAM is read from the non-volatile memory and written into the RAM. If any register information has been saved, this information too is written back into the registers. Once this is done, the normal operation can be resumed (box 43). If no power failure occurred during usage of the ICC, i.e. the PF bit is not set, the ICC according to the present invention starts to operate as usual (box 44).

As far as an application running on an ICC is concerned, several scenarios are possible: either, the application program developer did not consider a power failure at all. In most cases, this is no problem any longer when using the inventive approach, as the computation is resumed upon the next power-up, or as soon as the power failure is over. However, if the application has I/O operations pending, these will very likely time out as a new external environment might be found after reconnection. This is a communication error the application has to consider in any case, even if power failures were not a problem. It is now possible to inform an application about a power failure, for example by means of an explicit exception notification. Applications can then react accordingly, e.g., without aborting, but shortcutting operations possibly long running. Although transactions are now no longer necessary to protect against power failure, they could still be used to notify applications of this event to allow them to take appropriate action if necessary.

Certain ICCs require an external clock signal to be provided by the card terminal. If such an ICC is prematurely extracted from the terminal, or if the terminal's power supply goes down, not only the power supply is interrupted, but also the clock signal is not available to the ICC anymore. This might lead to problems, such a undefined states, if the ICC comprises circuitry which cannot be driven without a clock signal. In the following, a second embodiment of the present invention is described. The failure protection means of this second embodiment comprise special means that provide a clock signal. This embodiment is outlined in connection with FIG. 3.

Figure 3:
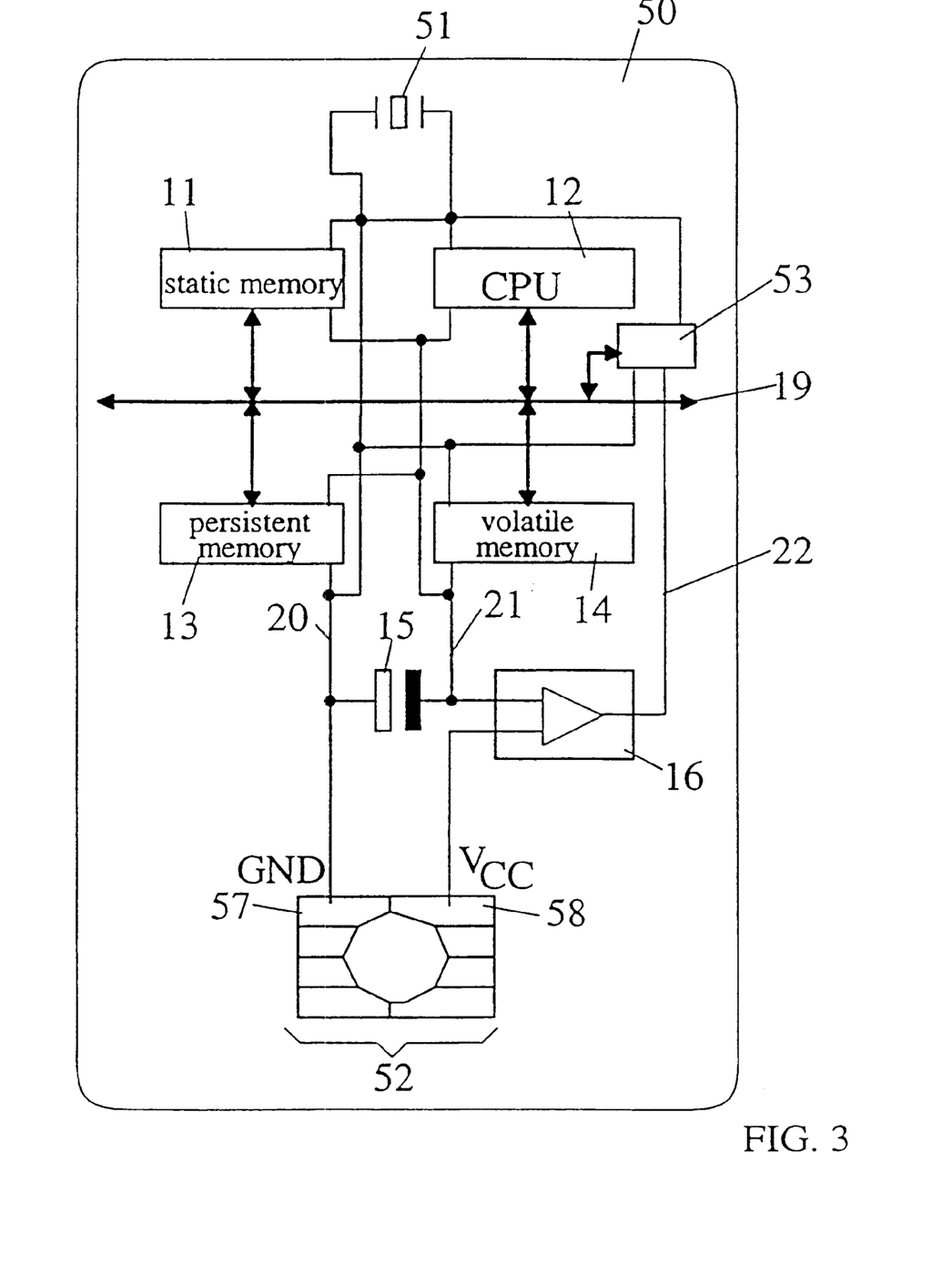
FIG. 3 is a schematic top view of a second embodiment, in accordance with the present invention.

The ICC 50 comprises typical power coupling means 52, which are arranged as defined by the ISO standard 7816. External power is applied to the ICC 50 by means of the contact pads 57 (GND) and 58 ($V_{CC}$). External power is applied to the power lines 20 and 21 which are coupled to the volatile memory 14 and other components to provide a normal and/or standby voltage. The failure protection means comprise a capacitor 15 (likewise several capacitors might be arranged in parallel), a clock generator 51, and a custom power failure circuitry 53. As shown in FIG. 3, this power failure circuitry 53 might be connected to the internal bus 19 so that it can communicate with certain components of the ICC 50. The power-failure detector 16 signals to the power failure circuitry 53 that a power failure occurred. For this purpose, the power failure circuitry 53 and power-failure detector 16 are interconnected by the signaling line 22. The ICC 50 behaves similar as the ICC 30, except that the steps illustrated in FIGS. 2A and 2B are carried out, or are controlled by the power failure circuitry 53.

There are different ways to realize such a power failure circuitry. Except for the capacitor, one can use off-the-shelf components (e.g. a processor and a non-volatile memory) together with an appropriate software component, or discrete hardware. Well suited are ASICs (application specific integrated circuits), provided that they can be integrated onto an ICC card.

Besides the significant reduction of necessary development efforts of software for ICCs, an inventive ICC also boasts two additional advantages. By associating some essential non-volatile memory areas with RAM space, memory-intensive applications usually operating on persistent store can be sped up significantly, as the respectively used RAM contents can be guaranteed to be saved back to non-volatile memory in case of power failure. This kind of efficiency enhancement can provide a significant competitive edge over a conventional ICC and any applications it runs.

Secondly, by over-dimensioning the capacitor, some current can be retained even after RAM and register contents have been written to persistent memory. This current can then be used to feed a security mechanism, as addressed in co-pending patent application entitled "PROTECTION OF SENSITIVE INFORMATION CONTAINED IN INTEGRATED CIRCUIT CARDS", filed on the same day as the instant application and presently assigned to the assignee of the instant application.

Power coupling means allow external power to be supplied to the ICC. Conventional contact pads (ports) or contact-less power coupling means can be employed. If contact pads are used, the card terminal's power supply connects to these pads if the ICC is placed in the card terminal. In case of a contact-less power supply the power coupling means are designed to allow an inductive loop to be established with the card terminal's power supply. In this case, power is supplied to the integrated circuit card by means of low frequency electronic magnetic radiation transfer.

Card Terminals can be improved by adding features that allow the reporting of power failure events to another system, such as an control station or operator console. The event reporting feature might be used to track down problems, to monitor events, and for record keeping purposes. The ICC's power-failure detector (e.g. detector 16 in FIG. 1), according to the present invention, reports a power failure to the ICC's failure protection means. An improved card terminal comprises event reporting means that receives input from the ICC if a power failure was detected by the card's power-failure detector. This can either be realized in that the respective signal (power failure) is made available at one of the ICC ports, or in that the card terminal is enabled to read out the PF bit which is set in case of a failure. The card terminal can either report a power failure using standard event reporting protocols, or by specially designed means.

The ICCs described in connection with the present invention, as well as other ICCs improved by adding the inventive components, might be used for many different purposes and in connection with various applications.

There are various reasons for a power failure, some of which were mentioned further above.

Even if an ICC is used in connection with a 'secure' card terminal in which the ICC is fully enclosed and secured by the engaging latch, a power failure might occur. This is the case for example if the terminal's power source is down, or if the power supply is unplugged. In all conceivable power failure situations, the inventive ICCs allow information to be safely written into persistent memory. Depending on the implementation and resources available, one might decide to transfer all information from volatile to persistent memory, or one might transfer only critical information.

The present invention allows conventional ICCs to be modified by simply integrating the essential components either as hardware, or as a combination of hardware and software. The invention enables a variety of applications that require recovery after a power failure.

In addition to the above described features and components, an ICC might comprise photo images, minidisplays, keyboards and so forth. In the future, an ICC might also comprise means for wireless communication.

What is claimed is:

1. Integrated circuit card comprising:

a processor;

volatile memory;

non-volatile memory;

power coupling means for allowing external power to be supplied to the card;

failure protection means for maintaining power for a short period of time in case of a power supply failure;

power-failure detector for sensing a power supply failure; and means for setting a power supply failure indicator (PF) into said non-volatile memory if a power supply failure is sensed by said power-failure detector, in order to leave a trace that a power supply failure has occurred, the failure protection means providing the power for setting said indicator (PF);

wherein the power-failure detector triggers the transfer of information from the volatile memory to the non-volatile memory if a power supply failure is sensed, and the failure protection means provides power for this transfer.

2. Integrated circuit card according to claim 1, wherein said integrated circuit card is a contactless card.

3. Integrated circuit card according to claim 2, wherein the power coupling means allow an inductive loop to be established with an external power supply such that power is supplied to the integrated circuit card by means of low frequency electronic magnetic radiation transfer.

4. Integrated circuit card according to claim 3, wherein the power-failure detector comprises means to sense an interrupt and/or reduction of the coupling efficiency of the inductive loop.

5. Integrated circuit card according to claim 1, wherein said power coupling means comprise contact pads for mechanical connection to an external power supply such that power is supplied to the integrated circuit card.

6. Integrated circuit card according to claim 5, wherein the power-failure detector comprises means to sense an interrupt of the power provided by the external power supply and/or a voltage drop of the power provided.

7. Integrated circuit card according to claim 1, wherein the information to be transferred from the volatile memory to the non-volatile memory is critical information which has to be made available when the power failure is over.

8. Integrated circuit card according to claim 1, wherein said failure protection means comprises a capacitor of sufficient capacitance for maintaining the power for the duration of the transfer of information.

9. Integrated circuit card according to claim 8, wherein said capacitance is in the order of several Farads per cm$^2$.

10. Integrated circuit card according to claim 8, wherein the capacitor is a high capacitance value multi-layer ceramic capacitor.

11. Integrated circuit card according to claim 1, wherein said failure protection means comprises a clock generator providing a clock signal to components of the integrated circuit card.

12. Integrated circuit card according to claim 1, wherein said failure protection means comprises a power failure handler which handles the transfer of information.

13. Integrated circuit card according to claim 1, wherein said power failure handler is a software component stored in a non-volatile memory and executed by the processor.

14. Integrated circuit card according to claim 1, wherein said power failure handler is implemented as a combination of hardware and software.

15. Integrated circuit card according to claim 1, wherein said power failure handler is implemented in an ASIC.

16. Recovery means for use in an integrated circuit card comprising a processor, volatile memory, non-volatile memory, and power coupling means allowing external power to be supplied to the card, said recovery means comprising:

failure protection means for supplying power to the integrated circuit card for a short period of time in case of a power supply failure;

a power-failure detector for sensing a failure of the external power supplied to the integrated circuit card; and means for setting a power supply failure indicator (PF) into said non-volatile memory if a power supply failure is sensed by said power-failure detector, in order to leave a trace that a power supply failure has occurred, the failure protection means providing the power for setting said indicator (PF);

wherein the power-failure detector triggers the transfer of information from the volatile memory to the non-volatile memory if a failure of the external power is sensed, and the failure protection means supplies power to the integrated circuit card for this transfer.

17. Recovery means of claim 16, comprising hardware and software components.

18. Recovery means of claim 16, wherein at least part of the recovery means' functionality is realized in an ASIC.

19. Recovery means of claim 17, wherein the software component is loaded into a non-volatile memory, preferably a ROM.

20. Method for the protection of information being stored in a volatile memory of an integrated circuit card, said integrated circuit card further comprising a processor, non-volatile memory, and power coupling means for allowing external power to be supplied to the card, said method comprising the following steps:

(a) detecting a failure of the external power supplied to the integrated circuit card;

(b) reading information from the volatile memory and transferring it to the non-volatile memory;

(c) writing the information into said non-volatile memory;

(d) setting a power supply failure indicator (PF) into said non-volatile memory in order to leave a trace that a power supply failure has occurred; and (e) supplying power, provided by a failure protection means being part of the integrated circuit card, at least during the execution of the above steps (a)–(d).

21. The method of claim 20, wherein only critical information is written into said non-volatile memory.

22. Method for the recovery of information which was stored in a non-volatile memory of an integrated circuit card after a failure of externally supplied power occurred, said integrated circuit card further comprising a processor, volatile memory, and power coupling means for allowing the external power to be supplied to the card, said method comprising the following steps:

(a) powering up the integrated circuit card;

(b) determining whether a failure of externally supplied power occurred prior to the powering up, by checking whether a power supply failure indicator (PF) was set into said non-volatile memory, said indicator PF being set if a failure of externally supplied power has occurred;

(c) reading the information from the non-volatile memory and transferring it to the volatile memory; and (d) writing the information into said volatile memory such that the integrated circuit card's state prior to the failure of externally supplied power is reestablished.

23. The method of claim 22, wherein the integrated circuit card's state prior to the failure of externally supplied power is reestablished without application program intervention.

24. Card terminal for use in connection with an integrated circuit card which comprises a processor; volatile memory; non-volatile memory; power coupling means for allowing external power to be supplied to the card; failure protection means for maintaining power for a short period of time in case of a power supply failure; and a power-failure detector for sensing a power supply failure; wherein the power-failure detector triggers the transfer of information from the volatile memory to the non-volatile memory if a power supply failure is sensed, and the failure protection means provide power for this transfer, said card terminal comprising:

event reporting means for receiving information from said integrated circuit card signaling that a power supply failure has occurred and for reporting said power supply failure to a remote system, the event reporting means receiving said information from said integrated circuit card by reading a non-volatile power failure indicator (PF) in said integrated circuit card, said indicator PF being set by said integrated circuit card after a power failure has been sensed.

25. The card terminal of claim 24, wherein said event reporting means receive the information from said integrated circuit card through a contact pad.

26. The card terminal of claim 24, wherein said remote system is an operator console or a control station.

* * * * *

UNITED STATES PATENT AND TRADEMARK OFFICE
CERTIFICATE OF CORRECTION

PATENT NO. : 6,536,671 B1
DATED : March 25, 2003
INVENTOR(S) : Michael Baentsch

It is certified that error appears in the above-identified patent and that said Letters Patent is hereby corrected as shown below:

Column 4,
Line 44, "FROM" should read -- EEPROM --
Lines 58-59, after "intervention" insert -- . --

Column 7,
Line 14, "wit" should read -- with --

Signed and Sealed this

Sixteenth Day of December, 2003

JAMES E. ROGAN
*Director of the United States Patent and Trademark Office*